United States Patent [19]

Takazawa

[11] 4,294,793
[45] Oct. 13, 1981

[54] METHOD AND APPARATUS FOR MANUFACTURING A SPHERICAL HOLLOW BODY

[75] Inventor: Kazuyasu Takazawa, Tokyo, Japan

[73] Assignee: Tachikara Kabushiki Kaisha, Tokyo, Japan

[21] Appl. No.: 125,389

[22] Filed: Feb. 27, 1980

Related U.S. Application Data

[63] Continuation of Ser. No. 894,007, Apr. 6, 1978, abandoned.

[30] Foreign Application Priority Data

Nov. 15, 1977 [JP] Japan ............................ 52-136813
Nov. 30, 1977 [JP] Japan ............................ 52-143379

[51] Int. Cl.³ ............................................. B29C 5/04
[52] U.S. Cl. ................................. 264/311; 425/430; 425/233
[58] Field of Search ............... 264/310, 311, DIG. 60; 425/429, 430, 233, 144

[56] References Cited

U.S. PATENT DOCUMENTS

| 2,957,202 | 10/1960 | Rekettye ................. | 425/430 X |
| 2,967,329 | 1/1961 | Friedland et al. .......... | 264/310 |
| 3,072,965 | 1/1963 | Miller ..................... | 425/430 X |
| 3,829,272 | 8/1974 | Carillon et al. ............ | 425/430 |
| 4,028,038 | 6/1977 | Haigh ..................... | 425/430 |

Primary Examiner—J. Howard Flint, Jr.
Attorney, Agent, or Firm—Blanchard, Flynn, Thiel, Boutell & Tanis

[57] ABSTRACT

Improved method for manufacturing a spherical hollow body are disclosed. The spherical hollow body has a use for a core member for manufacturing a football or a volleyball and is manufactured by cooling a thermoplastic resin contained in a spherical hollow mold which is forcedly circulated along a constant locus simultaneously with the rotary motions on two axes orthogonal to each other.

8 Claims, 3 Drawing Figures 4,294,793

METHOD AND APPARATUS FOR MANUFACTURING A SPHERICAL HOLLOW BODY

This is a continuation division, of application Ser. No. 894,007, filed Apr. 6, 1978, now abandoned.

BACKGROUND OF THE INVENTION

This invention relates to a method for manufacturing a spherical hollow body and more particularly to a method for manufacturing a spherical hollow body, that is, an inner core member for use in the manufacturing of footballs (i.e., soccerballs) or volleyballs.

There have been conventionally proposed various methods for manufacturing a truly spherical hollow ball for football or volleyball. One of the methods for football comprises the steps of forming a spherical hollow body as a core member, sticking cloth strips or rubber sheets with adhesives onto the surface thereof, winding round threads over all the surface thereof, cutting away a predetermined portion thereof to form a small aperture thereon and taking the collapsed pieces out of the hollow ball through the small aperture, inserting a tube with an air valve thereinto and pumping up the tube with air, and sticking outer leather sheets on the surface thereof. According to this specified method, a spherical ball is always produced for football or volleyball if a hollow body is perfectly made spherical. However, it has been difficult to provide a spherical hollow body with a uniform thickness so that there has been a disadvantage that the mechanical strength thereof is weak.

Accordingly, it is a main object of the present invention to provide a method for manufacturing a spherical hollow body having a uniform thickness in such a manner that no skilled person and technology are necessary in the manufacturing thereof.

SUMMARY OF THE INVENTION

According to one aspect of the present invention, there is provided a method for manufacturing a spherical hollow body used as a core member in the manufacturing of footballs or volleyballs comprising a step of cooling liquid thermoplastic resin in a spherical hollow mold to provide a hardened spherical hollow body, said spherical hollow mold being forcedly circulated along a constant locus simultaneously with the rotary motions on two axes orthogonal to each other.

The spherical hollow mold is provided with an opening and closing means consisting of a drive shaft having an axis running to the center of the sphere thereof and a motive shaft orthogonal to said drive shaft. Means cool liquid thermoplastic resin in said spherical mold to provide a hardened spherical hollow body.

BRIEF DESCRIPTION OF THE DRAWINGS

Further and more specific objects and advantages of the present invention and the manner in which it is carried into practice are made apparent in the following specification wherein, as noted above, the invention is described in detail with reference to the accompanying drawing, in which.

DETAILED DESCRIPTION OF THE PREFERRED EMBODIMENTS

Figure 1:
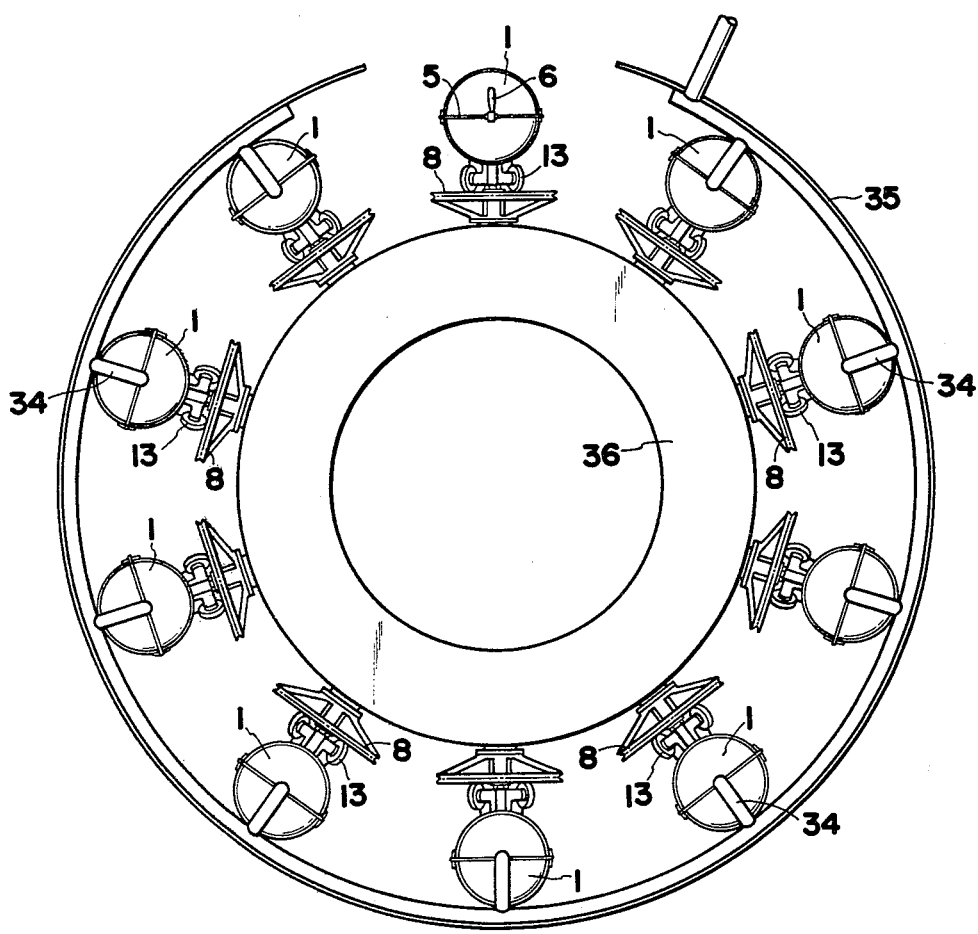
FIG. 1 is a top plan view illustrating an apparatus for practicing the method according to the present invention.
Figure 2:
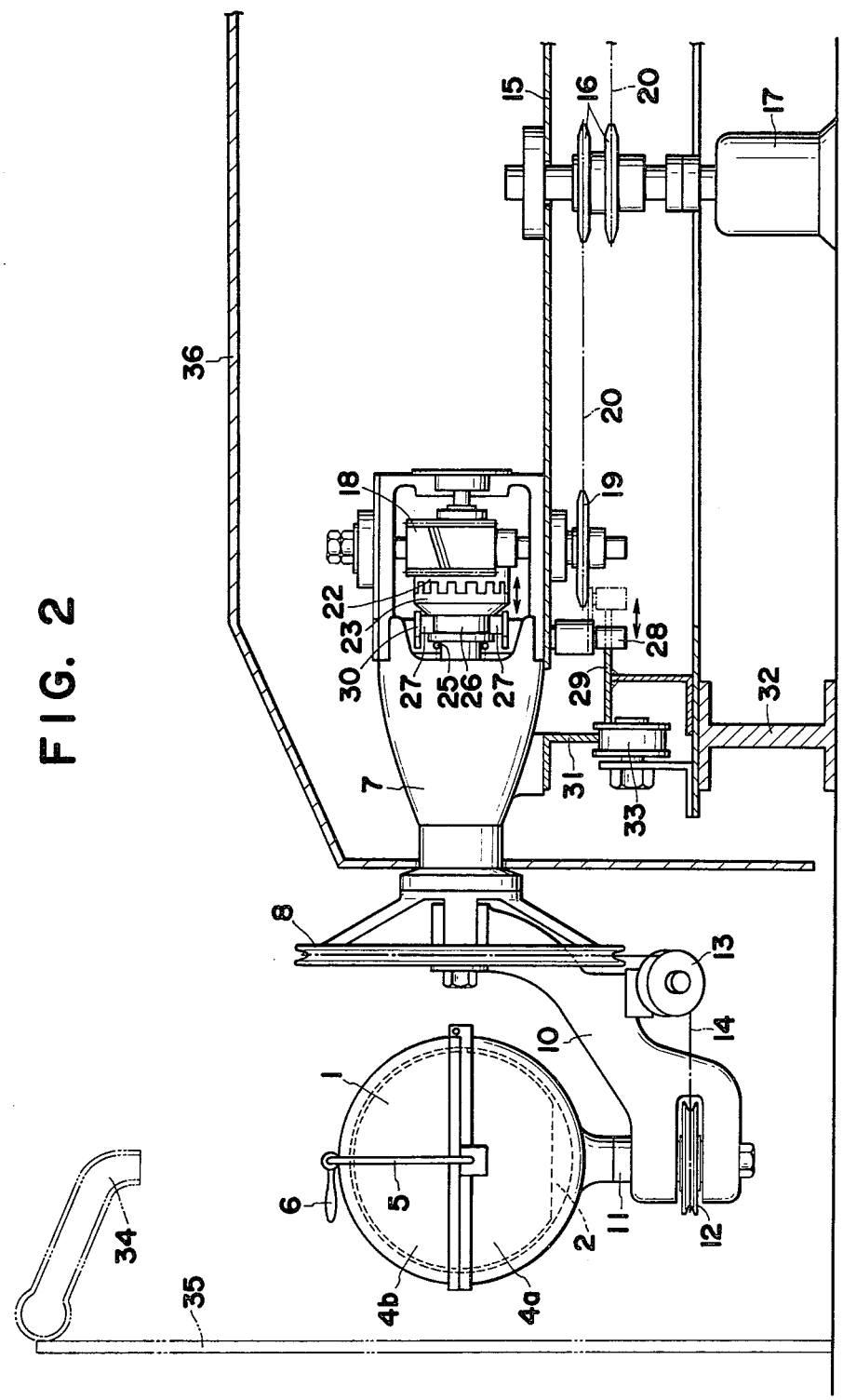
FIG. 2 is a side, partially broken view illustrating a portion of the FIG. 1. apparatus.
Figure 3:
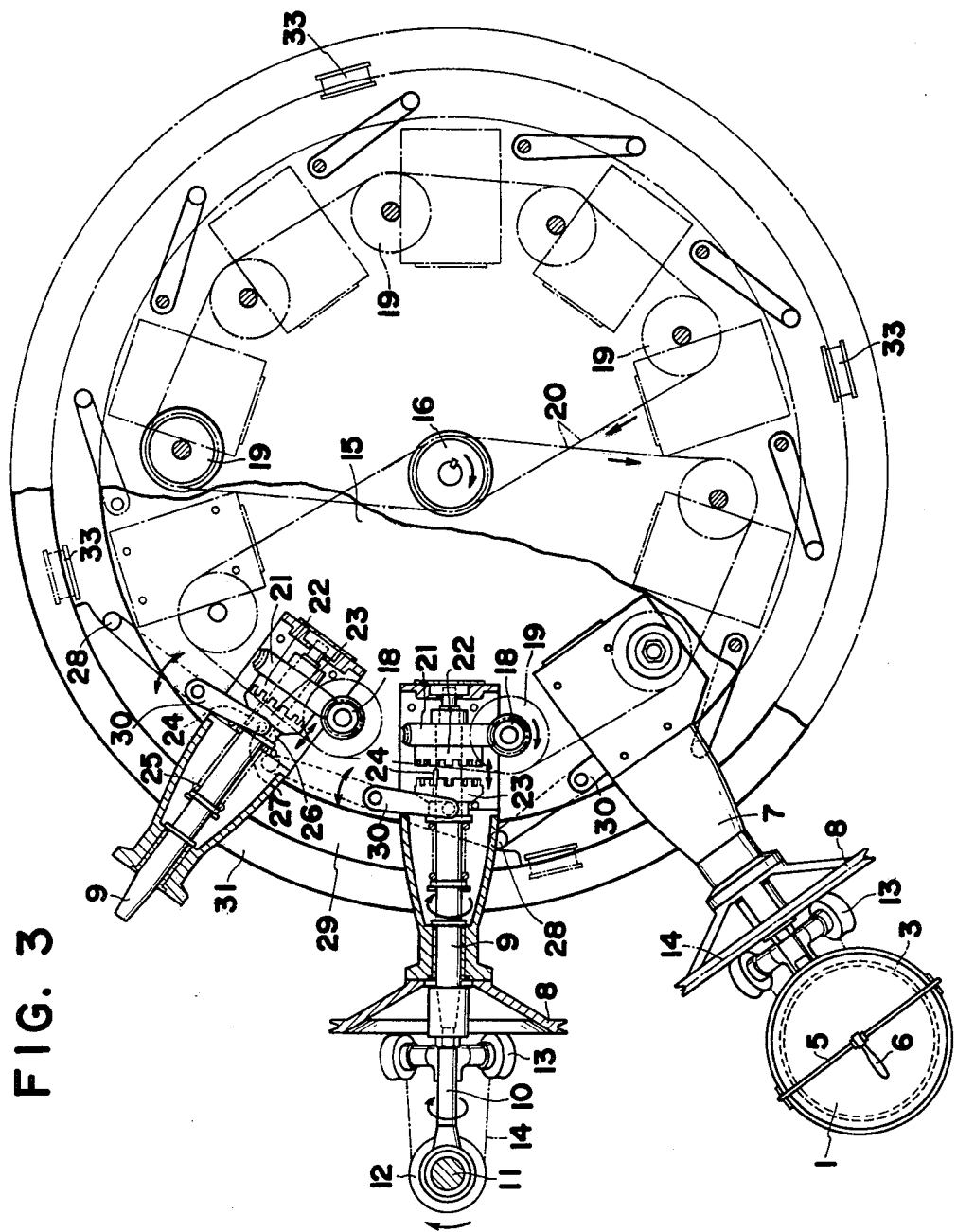
FIG. 3 is an enlarged top plan, partially broken view illustrating a portion of the FIG. 1 apparatus.

In FIGS. 1 to 3, there are shown a plurality of spherical hollow molds 1 which are circulated along a constant locus defined as a circle. Liquid thermoplastic resin 2 such as paraffin having a melting point 45° to 65° C. is put into the spherical hollow mold 1 in a predetermined quantity thereof as fixed depending upon the outer diameter and thickness of a spherical hollow body 3. The spherical hollow mold 1 is forcedly rotated on two axes orthogonal to each other. The first is the axis of a drive shaft 11 while the second is that of a motive shaft 9 orthogonal to the former one. As is apparent from the drawings, these two axes intersect substantially at the center of the respective mold. Accordingly, the liquid thermoplastic resin 2 contained in the spherical mold 1 is uniformly clung to the inner surface thereof due to the centrifugal effect during the two axes rotation even though the thermoplastic resin 2 is first positioned in the bottom of the spherical mold 1. The thermoplastic resin 2 is cooled by water during the circulation of the spherical mold 1 along a constant locus such as a circle locus to provide a spherical hollow body 3 having a uniform thickness on the inner surface thereof.

According to a method for manufacturing a spherical hollow body 3 set forth above, a hollow body having substantially a truly spherical shape is produced only by forming the inner surface of the mold 1 as spherical. Further, the spherical hollow body 3 is formed to have a uniform thickness for the reason that the spherical hollow mold 1 is rotated on the two axes orthogonal to each other. Accordingly, a strong spherical hollow body 3 is produced in regard to mechanical strength because such a shape is most desired for that strength.

Reference is made back to FIGS. 1 to 3, there are shown a plurality of the spherical molds 1 each consisting of hemispheres 4a and 4b devided at a plane of the center thereof and connected by a hinge. The spherical hollow mold 1 is provided with a frame rod 5 having a hemisphereical shape positioned at a place shifted by 90 degrees from the hinge. The frame rod 5 is provided with a cam having a handle 6 to fasten or loosen the hemisphere 4b. This means for opening and closing the spherical hollow mold 1 as illustrated in FIGS. 1 to 3 makes the opening and closing operation easier and more reliable.

The spherical hollow mold 1 is forcedly rotated on the two axes orthogonal to each other by means of the motive shaft 9 and the drive shaft 11. The motive shaft 9 is rotatively provided on a frame body 7 and has a rotary axis running through the center axis of a pulley 8 fixed to the frame body 7. The motive shaft 9 is provided with an L-shaped arm 10 and the latter is rotated as the former rotates. The arm 10 is provided with the drive shaft 11 rotatable independently thereof and orthogonal to the center axis of the pulley 8. Further, a rotary pulley 12 is fixed to the drive shaft 11 and to one end thereof the spherical hollow mold 1 is installed. An endless belt 14 is suspended through an intermediate pulley 13 over the fixed pulley 8 and the rotary pulley 12. In this construction, the fixed pulley 8 is relatively rotated on the axis of the motive shaft 9 as the latter rotates. Accordingly, the endless belt 14 shifts the place thereof around the fixed pulley 8 in such a manner that the former winds round and off the latter at one and another ends respectively. This allows the rotary pulley 12 and the drive shaft 11 to rotate in the same direction as the fixed pulley 8. As the result, the spherical hollow mold 1 fixed to the arm 10 is rotated on the two axes of the motive shaft 9 and the drive shaft 11 in accordance with the rotation of the arm 10.

In this two axes rotation, a combination of gears may be alternatively adopted in place of an endless belt as illustrated above. However, an endless belt is preferably used to improve an effect of operation because it is possible to pour water for cooling the thermoplastic resin and oiling is unnecessary.

Ten sets of the frame body 7 are installed on a turn table 15 such that each motive shaft 9 is radially positioned with its axis running through the rotational center of the turn table 15. Under the lower center portion of the turn table there is installed a motor 17 having motive chain gears 16 attached thereto. Behind each frame body 7 is a worm 18 attached to a driven gear 19. The motive chain gear 16 is interlocked with each of the driven chain gears 19 by a chain 20. On the other hand, a worm wheel 21 is connected and disconnected through clutch members 22 and 23 with the motive shaft 9 and adapted to receive the rotation of the worm 18. A motive clutch member 22 is fixed to the worm wheel 21 while a driven clutch member 23 slides along a key 24 provided on the motive shaft 9 and is forcedly linked with the motive clutch member 22 by means of spring 25 provided thereon. Further, the driven clutch member 23 is provided with a guiding groove 26 on a periphery thereof.

Within the guiding groove 26 is positioned a roll member 27 while another roll member 28 is provided on a stationary guiding rod 30 and adapted to slide along a stationary guiding plate or cam 29 installed at a place where the thermoplastic resin is put into and removed from the spherical hollow mold 1. Accordingly, the clutch members 22 and 23 normally linked by the spring 25 are disconnected as the roll member 28 attached to the guiding rod 30 makes contact with the edge surface of the guiding plate 29 to result in the swing of the guiding rod 30 so that the rotation of the motor 17 is no longer conveyed to the motive shaft 9.

The corresponding number of motors may be alternatively installed to drive each of the motive shafts 9 in place of a single motor 17 as illustrated in FIG. 2. However, the single motor 17 is operated with an excellent efficiency and the turn table 15 is circulated without preventing the motive shafts 9 from rotating if the motive chain gear 16 interlocked with the single motor 17 is positioned under the center of the turn table 15 and each of the motive shafts 9 is conveyed the rotation thereof by means of the chain 20.

Although the spherical hollow body 3 be taken out of the spherical hollow mold 1 even where the rotatory speed thereof, that is, the rotatory number of the motive shaft 9 is relatively low, the spherical hollow mold 1 is preferable caused to stop in the circulation thereof in accordance with the stopping of the motive shaft 9 by means of the clutches 22 and 23 and the connecting and disconnecting means consisting of the parts 25, 26, 27, 28, 29 and 30 when the frame body 7 assumes a predetermined position. An operator can put a thermoplastic resin into the spherical mold 1 and take out the spherical hollow body 3 therefrom easily due to the stopping of the spherical hollow mold 1 so that the efficiency of operation is extremely improved. Further, two of the guiding plates or cams 29 are alternatively positioned at the opposite places of both sides of the motor 17 to provide two working places for operators. In such a case, two operators are allowed to simultaneously put a thermoplastic resin into the spherical mold 1 and take out the spherical hollow body 3 therefrom at the opposite places.

An angle steel is installed to provide a rail 31 having a circle shape in its plane which is supported on rollers 33. The rollers 33 are fixed to a base 32 on the ground so that the turn table 15 is circulated on the axis of the motive chain gear 16 together with the frame bodies 7.

In this embodiment, this circulatory motion is manually operated so that the operation of taking out the spherical hollow body 3 from the spherical mold 1 and putting a thermoplastic resin thereinto is made easily in accordance with the working capability of operators. However, a motor may be alternatively adopted instead of a manual operation of the circulatory motion of the turn table. Further, the rail 31 and the roller 33 may be exchanged in their installed positions relative to each other. It goes without saying that the rail 31 serves as a support for the frame bodies 7 other than a guide for the circulatory motion.

Cooling is provided to harden (solidify) a liquid thermoplastic resin contained in the spherical hollow mold 1 at a temperature below the melting point thereof to provide a spherical hollow body 3 which is used as a core member in the manufacturing of a football or a volleyball. Although cooling is possible by both fluid and gas, water is used in this embodiment.

Water discharge nozzles 34 are installed at equal intervals except at the working place for an operator. Accordingly, the water nozzles 34 are always right above the spherical hollow molds 1 when an operator handles any one of the spherical molds 1 as shown in FIG. 1. When water is used for cooling the spherical hollow mold 1, advantages of low cost and goods heat conductivity can be expected. In this embodiment, an outer frame 35 is installed except at the working place for an operator to avoid the scattering of water and a protective cover 36 is installed to prevent water from splashing on the interior mechanics of this apparatus.

There will now be obvious to those skilled in the art many modifications and variations of the above described structure. These modification and variations will not depart from the scope of the invention if defined by the following claims.

What I claim is:

1. A method for manufacturing a spherical hollow body, comprising the steps of:

providing a plurality of individual openable spherical hollow molds each defining therein a single spherical mold cavity disposed so that its center is located substantially at the intersection of first and second orthogonal rotational axes;

mounting said molds in horizontally angularly spaced relationship on a supporting turntable rotatable about a vertical axis positioned at the center of a circular locus defined by the centers of said plurality of molds;

loading liquid thermoplastic material into each said hollow mold at an operator position;

circulating said hollow molds along a horizontal circular path by movement of said supporting turntable about said vertical axis so that the centers of said molds are maintained in a horizontal plane defined by said circular locus;

rotating each said spherical hollow mold with respect to said turntable about said first axis by clutching a rotating drive member to said spherical hollow mold through a clutch having driving and driven clutch members to effect said rotating;

simultaneously rotating each said spherical hollow mold with respect to said turntable about said second axis whenever the respective mold is rotated about said first axis by rotatably driving the mold through a clutch-free driving mechanism which is continuously driven whenever said driven clutch member is rotatably driven;

forcibly effecting said circulating of the turntable during said rotation of the molds;

discharging cooling water over the molds for effecting hardening of the thermoplastic material to provide a hardened spherical body while continuing to rotate said molds simultaneously about said first and second orthogonal axes;

circulating a declutching member with said turntable for each said hollow spherical mold and connecting said declutching member to said clutch of the respective hollow spherical mold;

locating an elongated guide plate in fixed relation to said operator position adjacent said turntable;

riding the follower along the guide plate contoured to move the following transversely thereof to effect declutching and clutching of each said mold from the corresponding said drive member by contact of said guide plate and follower moving said declutching member with respect to said turntable as said turntable circulates each said mold respectively into and out of said operator position.

2. The method of claim 1, including positively connecting a common drive motor to effect both said circulating of said turntable and rotation of said rotative drive members of said spherical hollow molds.

3. An apparatus for manufacturing a spherical hollow body, comprising:
rotatable turntable means supported for rotation about a main axis;
a plurality of individual openable spherical hollow molds each defining therein a single spherical mold cavity disposed so that its center is located substantially at the intersection of first and second orthogonal rotational axes;
means mounting said molds in angularly spaced relationship on said turntable means so that the main axis thereof is positioned at the center of a circular locus defined by the centers of said plurality of molds;
drive means interconnected to said turntable means for effecting rotation thereof about said main axis;

said mounting means including first means rotatably supported for rotation on said turntable means about said first axis, and intermediate means drivingly connected between said drive means and said first means, said intermediate means including a clutch having driving and driven clutch members;

said mounting means also including second means drivingly connected between said first means and the respective hollow mold for defining a clutch-free driving mechanism to effect continuous rotation of the respective mold about said second axis whenever the respective mold is rotated about said first axis; and means for effecting disengagement of said clutch at a selected rotational position of said turntable means so as to permit termination of the rotation of the respective mold to permit opening thereof.

4. An apparatus according to claim 3, wherein said first means includes a first axle which defines and is rotatable about said first axis, said first axle having a radially-projecting arm structure fixed thereto and rotatable therewith, said second means including a second axle which is rotatably supported on said arm and projects in a cantilever fashion therefrom, said second axle defining said second axis and having said mold mounted thereon, said second means also including first and second pulley means which are respectively fixed to said first and second axles for rotation therewith, and endless driving means extending between and drivingly engaged with said first and second pulley means for effecting rotation of the second pulley means solely when the first pulley means is rotated.

5. An apparatus according to claim 3 or 4, including means positioned at a selected location adjacent said turntable means for discharging cooling water over the molds for effecting hardening of the material therein while said molds simultaneously rotate about said first and second orthogonal axes.

6. An apparatus for manufacturing a spherical hollow body according to claim 3, wherein said spherical hollow mold has two portions connected with each other by a hinge and is provided with a frame rod which has a cam with a handle to open or close said two portions.

7. An apparatus according to claim 3 or 4 wherein said main axis projects substantially vertically.

8. An apparatus according to claim 3 or 4, wherein said means for effecting disengagement of said clutch includes stationary guide means and follower means associated with each said hollow mold and movably supported on said turntable means and coacting between said stationary guide means and the respective clutch for automatically effecting disengagement of said clutch as the turntable means moves the respective hollow mold into said selected rotational position.

* * * * *